Oct. 5, 1926.
C. A. STAUFFER
PLANT WATERING DEVICE
Filed July 1, 1925
1,601,778
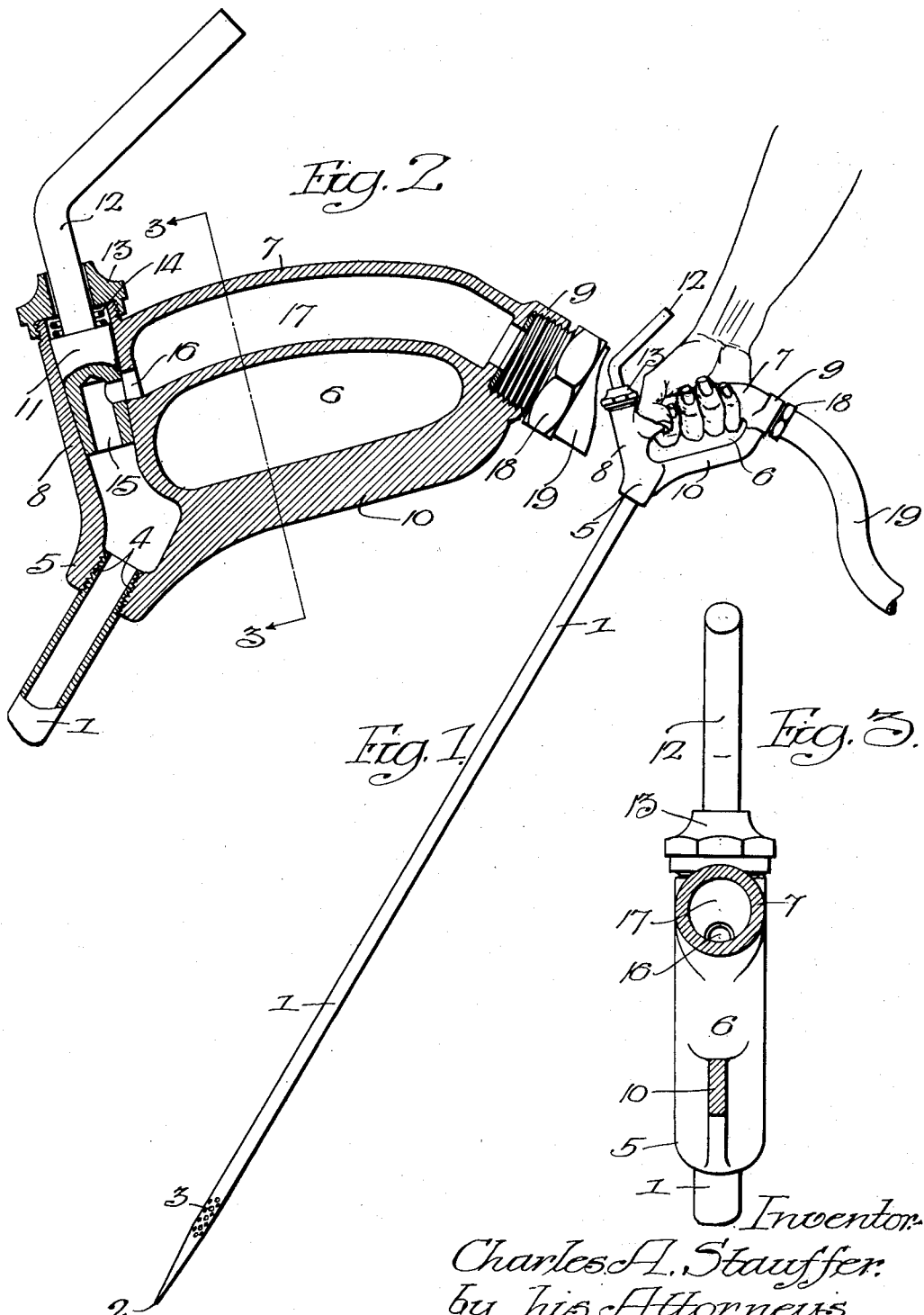
Inventor
Charles A. Stauffer
by his Attorneys
Howson & Howson Patented Oct. 5, 1926.

1,601,778

UNITED STATES PATENT OFFICE.

CHARLES A. STAUFFER, OF HONEY BROOK, PENNSYLVANIA, ASSIGNOR TO STAUFFER MACHINE WORKS, OF HONEY BROOK, PENNSYLVANIA, A FIRM COMPOSED OF CHARLES A. STAUFFER, CHARLES L. HOSLER, AND ALFRED STAUFFER.

PLANT-WATERING DEVICE.

Application filed July 1, 1925. Serial No. 40,885.

My invention relates to certain improvements in devices for watering plants under the surface of the ground in order to apply moisture at a point near, or under, the roots of the plant.

One object of the invention is to construct the device so that the handle will be in direct alignment with the penetrating tube so that pressure can be applied with such force as to cause the tube to penetrate the ground to the depth required.

Another object of the invention is to make the valve structure an integral part of the handle.

In the accompanying drawings:

Fig. 1 is a side view of my improved plant watering device, showing a hand grasping the hand hold.

Fig. 2 is a sectional view of the handle; and

Fig. 3 is a transverse section on the line 3—3, Fig. 2.

The tube 1 has a sharp point 2 at one end to penetrate the ground. Above the point are holes 3 through which the water escapes from the tube into the ground. The opposite end of the tube is screw-threaded, as at 4, and is screwed into the threaded opening in the projection 5 of the handle 6. The handle 6 is made in a single casting and has a tubular head 7, a valve casing 8, a coupling section 9 at the rear of the hand hold, and a reinforcing brace 10, which connects the lower portion of the valve with the coupling section 9 at the rear of the hand hold. The brace 10 is made comparatively thin, as shown in Fig. 3.

The interior of the valve casing 8 is tapered, as shown in Fig. 2. This tapered portion forms a seat for a tapered valve 11, which is provided with a stem 12 that is bent to form a handle. A screw cap 13 is mounted on a threaded projection of the handle 6 and a spring 14 is located between the screw cap and the valve. This spring holds the valve yieldingly to its seat. The valve has a right-angled passage 15, which can be brought into alignment with a port 16 communicating with the passage 17 in the hand hold 7 of the handle.

The coupling section of the handle is threaded to receive the coupling 18 of a hose 19.

On referring to Fig. 1 of the drawings, it will be seen that the transverse center of the handhold 7 is in a direct line with the tube 1 so that force can be exerted directly upon the tube to cause it to penetrate the ground to the depth desired. The hand hold is also arranged at an angle in respect to the longitudinal line of the tube so that the hand hold can be grasped in the most effective position.

By the use of the device hereinbefore described, plants can be supplied with water, or liquid fertilizer, at a point below the surface of the ground, and, preferably, below the main roots.

I claim:

The combination in a plant watering device, of a tube having a point at one end and perforated near the point, a handle secured to the opposite end of the tube and having a curved hollow hand-hold arranged at an angle in respect to the longitudinal line of the tube, the transverse centre of the hand-hold being in direct line with the tube; a valve chamber in the forward end of the handle; a valve therein having an operating arm extending over the hand-hold; and a coupling section at the rear end of the hand-hold, arranged to be attached to a hose.

CHARLES A. STAUFFER.